E. PRICE.
ELECTRICALLY CONTROLLED BRAKE.
APPLICATION FILED OCT. 16, 1908.
1,022,001.
Patented Apr. 2, 1912.
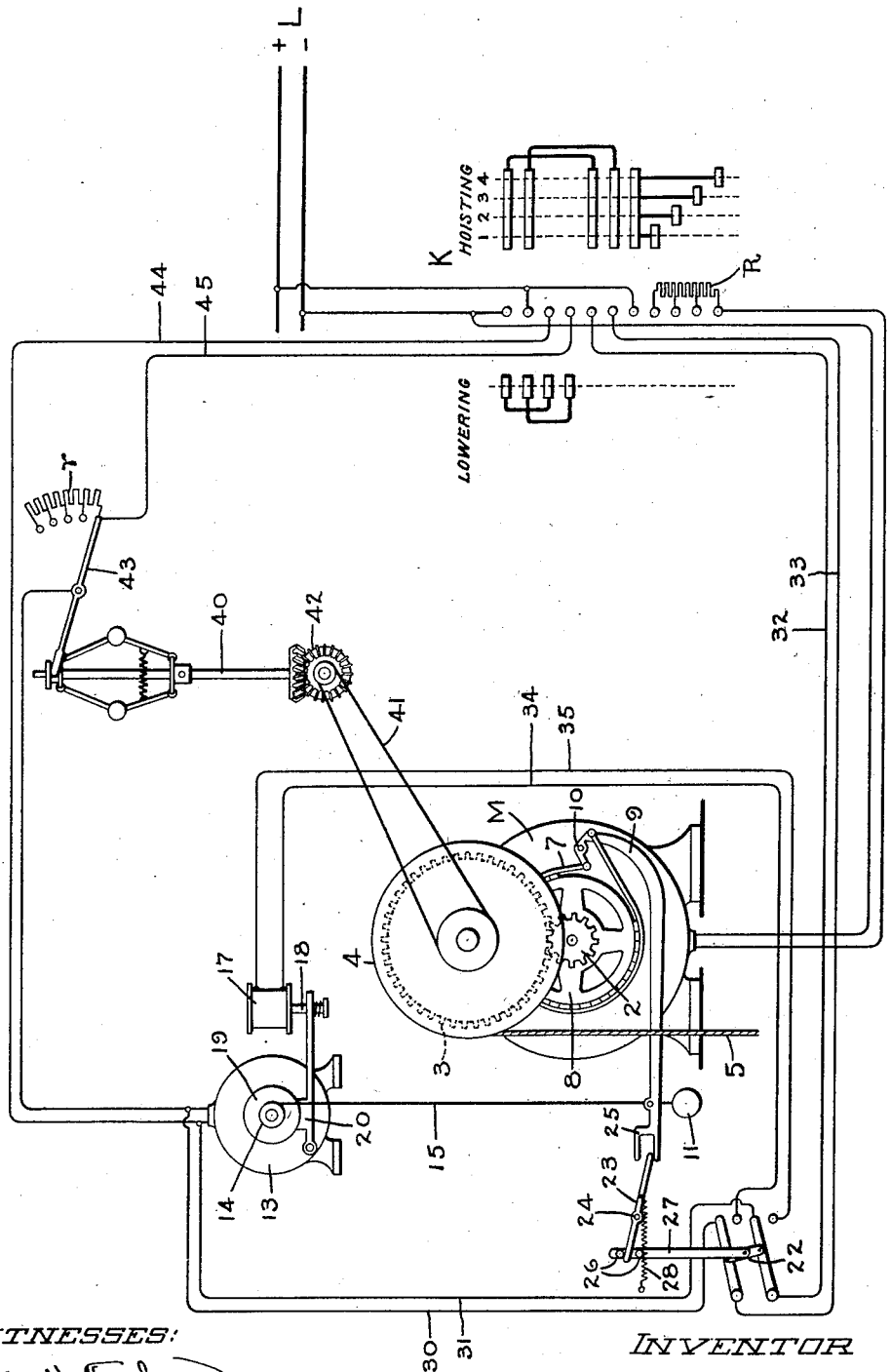
WITNESSES:
INVENTOR
EDGAR PRICE.
BY
ATT'Y.

UNITED STATES PATENT OFFICE.

EDGAR PRICE, OF SCHENECTADY, NEW YORK, ASSIGNOR TO GENERAL ELECTRIC COMPANY, A CORPORATION OF NEW YORK.

ELECTRICALLY-CONTROLLED BRAKE.

1,022,001.   Specification of Letters Patent.   Patented Apr. 2, 1912.

Application filed October 16, 1908. Serial No. 457,997.

*To all whom it may concern:*

Be it known that I, EDGAR PRICE, a citizen of the United States, residing at Schenectady, county of Schenectady, State of New York, have invented certain new and useful Improvements in Electrically-Controlled Brakes, of which the following is a specification.

My invention relates to brakes, and particularly to electrically controlled brakes used in connection with rotatable mechanisms.

It is especially applicable to hoists and similar kinds of apparatus but, as will be obvious, it is not limited to such uses.

Electrically controlled braking devices are well known in which the brake is biased to an " on " position and is released by an electromagnet, a motor, or other electromotive device which, when energized, moves some part of the brake mechanism. With small brakes an electromagnet having a movable armature is generally sufficient to exert the force required for releasing the brake, but with the larger sizes of brake it has been found more practicable to employ an electric motor which, when energized, furnishes torque which may be applied to the releasing of the brake. With both of these electromotive devices, particularly when large and operating under conditions where it is necessary to maintain the brake released a considerable time, heating of the energizing coils of the device and large consumption of electric current become objectionable features.

It is an object of my invention to provide a brake system in which the brake is released by an electromotive device, with automatically operated means whereby, after the brake has been released, the electromotive device is deënergized and the brake held in its released position, while at the same time the re-application of the brake is insured under conditions which call for braking.

Another object of my invention is to provide a system of braking in which in addition to the above feature the brake is released by an electromotive device, the torque of which is suitably controlled by the speed of the mechanism, to the end that the application of the brake is regulated and the speed of the mechanism prevented from exceeding a certain value.

Other objects of my invention will appear from the following description which, in connection with the accompanying drawing, sets forth one form in which it may be embodied.

The drawing shows, in a diagrammatic way, my invention as applied to a hoist driven by an electric motor.

The system shown is, as will be apparent, equally applicable to a hoist or similar device driven by any other motive device, such as a steam engine, water wheel, etc.

Referring to the drawing, at M is indicated a motor which through a pinion 2 and a gear 3 drives a winding drum 4, on which the rope 5 of a hoist is wound. The motor M receives its current from a suitable source L and is controlled by a rheostatic controller K, diagrammatically indicated in a well known conventional manner.

In the simple system shown the controller is arranged to energize the motor for but one direction of rotation and serves to cut out step-by-step the sections of the resistance R.

For the sake of simplicity it is assumed that the load on the hoist is sufficient at all times to cause the drum to unwind and the motor to rotate reversely when the latter is deënergized and the brake, hereinafter referred to, is released.

The shaft of the motor is shown as provided with a well known form of band brake, consisting of a metal strip 7 which surrounds a brake wheel 8, the ends of this strip being secured to a lever 9 pivoted at 10, the weight of the lever 9 being, if necessary, increased by a weight 11 in order to strongly bias the brake to an " on " position or in other words, to engage the brake wheel 8. The end of the lever 9 is lifted and the brake released by means of an electromotive device consisting, in this case, of an electric motor 13, the shaft of which carries a drum 14 upon which is wound up a rope, wire or chain 15 connected to the lever 9 near its end. When the motor 13 is energized its torque exerts an upward pull on the chain 15 resulting in the release of the brake which is held in its " off " position, the position in which it is not in braking engagement with the brake wheel 8, without maintaining the motor 13 energized, by other means hereinafter referred to.

This means for holding the brake in its "off" position independently of the motor 13, may act directly on the brake lever, but in the arrangement shown acts instead on the motor 13 and comprises an electromagnet 17 having a movable core of magnetic material 18 arranged when energized to apply to the motor 13 a holding brake consisting of a brake wheel 19 secured to the shaft of said motor with which wheel a brake shoe 20 engages, this shoe being carried by a lever moved by the core 18 of the magnet 17 in a manner clear from the drawing.

A double pole switch 22 is arranged to be thrown from one position to the other when the brake lever 9 is moved to its extreme "on" or "off" positions. This switch device may be of any suitable construction, the form shown comprising essentially a lever 23 pivoted at 24, one end of which engages with the bifurcated end 25 of the lever 9, while the other end extends between lugs 26 on a sliding member 27 secured to the movable parts of the switch 22. A spring 28, arranged as shown, holds the switch in either position and causes quick movement of the parts of the switch mechanism from one position to the other. In the arrangement shown, the switch 22 in the "on" position of the brake connects the wires 30 and 31, leading to the motor 13, to the wires 32 and 33 which receive current from the source L through contacts on the controller K closed in all hoisting positions of said controller, while in the position corresponding to the "off" position of the brake, the switch 22 connects the wires 32 and 33 to the wires 34 and 35 leading to the coil of the electromagnet 17.

The rotatable mechanism is provided with a speed responsive device which in the present case is shown as consisting of a well known type of ball governor 40 driven from the shaft of the winding drum by a belt or chain 41 and beveled gears 42. This ball governor 40 is arranged to move the arm 43 of a rheostat $r$ so as to cut more or less of the resistance $r$ into and out of a circuit leading to the brake releasing motor 13, according as the speed of the rotating mechanism is greater or less. This circuit to the motor 13 comprises wires 44 and 45 which are connected to the source L through contacts closed by the controller when the latter is in the lowering or brake releasing position.

The operation of the system shown is as follows: As illustrated, the controller K is in its "off" position and the hoist is at rest. When the controller K is thrown to its first "hoisting" position the driving motor M is connected to the source L through all of the resistance R. At the same time the wires 32 and 33 are connected to the source L through contacts on the controller and, the switch 22 being in the position shown, the motor 13 is energized. Energization of the motor 13 causes its armature to rotate and the chain 15 to be wound up, thereby raising the brake lever 9 and releasing the brake. When the brake is released, the switch 22 is thrown from the position shown to its other position and the wires 30 and 31 are disconnected from and the wires 34 and 35 are connected to the wires 32 and 33. This results in deënergizing the motor 13 and energizing the magnet 17 which applies the holding brake to the motor 13 and maintains the brake lever 9 in its raised position. The driving motor brake will be maintained released in this way as long as the controller K is in any of its "hoisting" positions. When the controller is thrown back to its "off" position, or if the current at the source for any reason fails, the magnet 17 is deënergized, the holding device controlled by it is released, the lever 9 drops and the driving motor brake is applied. When the lever 9 moves to its "off" position the switch 22 is thrown back to the position shown in the drawing and, upon reënergizing of the wires 32 and 33, the motor 13 will release the brake as before. If the controller K is thrown to the lowering or brake releasing position, the wires 44 and 45 are connected to the source L and the motor 13 is energized through this circuit. The driving motor brake is thereby released and the drum 4 begins to rotate in the direction to unwind the rope 5. The ball governor 40 responds to the speed of the rotating mechanism and is set so that when the speed exceeds a certain value, more or less of the resistance $r$ will be cut into the wire 45 and the torque of the motor 13 thereby decreased sufficiently to allow the weight of the brake lever 9 to overhaul the armature of the motor 13, thereby causing the driving motor brake to be applied. Application of the brake decreases the speed of the rotating mechanism, the ball governor responds to the change, and the amount of resistance $r$ included in the wire 45 is reduced, thereby increasing the torque of the motor 13 again and releasing the driving motor brake. In this way it is clear that the speed of the rotating mechanism will be prevented from exceeding a certain value during lowering. The wires 32 and 33 are, of course, not energized in the lowering position of the controller, and the switch 22 and the magnet 17 are, therefore, under this condition inoperative.

I have shown the controlling means for the brake mechanism incorporated in the motor controller, but it is obvious that, if desired, it may be made entirely separate. It is obvious, also, that either of the arrangements for controlling the brake may be used alone as well as in connection with the other.

When the two arrangements are consolidated, as herein shown, it is desirable that the controlling means therefor be such that only one of said arrangements can be rendered operative at a time, since the operation of one precludes the operation of the other.

While I have shown but one form in which my invention may be embodied, I do not wish to be understood as limiting myself thereto, but aim in the appended claims to cover all arrangements which come within the scope of my invention.

What I claim as new and desire to secure by Letters Patent of the United States, is,—

1. In combination, a rotatable mechanism, a brake therefor biased to an " on " position, an electromotive device for releasing the brake, an electrically controlled holding device for holding said brake released, and means operative upon the release of said brake for interrupting the circuit to said electromotive device and completing a circuit to said holding device; a means responsive to the speed of said mechanism for varying the torque of said electromotive device, and means for rendering either the holding device or the last named means operative but not both at the same time.

2. In combination, a rotatable mechanism, a controller therefor, a brake for said mechanism biased to an " on " position, means operative in certain positions of the controller for controlling said brake comprising an electromotive device, an electrically controlled holding device for holding said brake released, and means operative upon the release of said brake for interrupting the circuit from said controller to said electromotive device and completing a circuit from said controller to said holding device; and another means, operative in another position of said controller, coöperating with said electromotive device, and a resistance, said last named means being responsive to the speed of said mechanism for cutting said resistance into and out of circuit with said electromotive device according as the speed of said mechanism becomes greater or less than a certain value.

3. In combination, a motor, a hoist driven thereby, a controller for said motor having hoisting and lowering positions, a brake for said motor biased to an "on " position, means operative from said controller when the same is in a hoisting position, for releasing said brake comprising an electromotive device, an electrically controlled holding device for holding said brake released, and means operative upon the release of said brake for interrupting the circuit from the controller to said electromotive device, and completing the circuit from said controller to said holding device; and another means, operative in a lowering position of said controller, coöperating with said electromotive device, and a resistance, said last named means being responsive to the speed of said hoist for cutting said resistance into and out of circuit with said electromotive device according as the speed of said hoist becomes greater or less than a certain value.

4. In combination, a rotatable mechanism, a brake therefor biased to an "on " position, means for releasing said brake comprising an electromotive device, an electrically controlled device for holding said brake released, and means operative automatically upon the release of said brake for interrupting the circuit to said electromotive device and completing the circuit to said holding device.

5. In combination, a rotatable mechanism, a brake therefor biased to an " on " position, a brake releasing motor, an electrically controlled device for holding said brake in its released position, means for closing a circuit from a source to said brake releasing motor, and a switch device automatically operated upon release of said brake for interrupting the circuit to said brake releasing motor and completing the circuit to said electrically controlled holding device.

6. In combination, a rotatable mechanism, a brake therefor biased to an "on " position, a brake releasing motor, an electrically controlled device for holding said motor in the position corresponding to the released position of said brake, means for connecting said motor to a source of current, and a switch device automatically operating with said brake to connect said motor to said means when the brake is applied and to connect said holding device to said means when said brake is released.

In witness whereof, I have hereunto set my hand this 14th day of October, 1908.

EDGAR PRICE.

Witnesses:
BENJAMIN B. HULL,
HELEN ORFORD.

Copies of this patent may be obtained for five cents each, by addressing the " Commissioner of Patents, Washington, D. C."